Patented July 24, 1934

1,967,959

UNITED STATES PATENT OFFICE 1,967,959

PROCESS OF PRODUCING LIME-GYPSUM PLASTER

Samuel Gerard McAnally, Catasauqua, Pa.

No Drawing. Application December 11, 1930,
Serial No. 501,741

7 Claims. (Cl. 106—34)

This invention relates to the manufacture of lime-gypsum plaster, and more particularly to an improvement in the method of producing such plasters. An important object of the invention is the provision of a process of producing calcined-gypsum hydrated-lime plasters without the use of fuel, and which great economy of time and labor while at the same time producing a plaster superior to those heretofore employed by the trade.

In the ordinary process of manufacturing calcined gypsum, raw gypsum is heated in calciners to a temperature of about 175° C., in order to partially dehydrate the gypsum and produce plaster of Paris or hard wall plaster. If the calcining temperature is raised to approximately 220° C., a plaster is produced which is used in the manufacture of casting and finishing plasters.

In the manufacture of hydrated lime by the usual process, burnt lime is mixed with water, the amount of water employed usually being in excess of that required for hydration and the excess water being expelled by evaporation resulting from the heat of reaction.

Mixtures of calcined gypsum and hydrated lime in various proportions are employed in the building industries, the calcined gypsum being mixed with the hydrated lime after the calcination of the gypsum. It has, heretofore, been proposed that the calcination of the gypsum and the hydration of the lime be effected coincidentally and while these substances were in a mix of desired proportions. This process, however, contemplated continuous heating of the mixture of lime and gypsum, by externally applied heat, throughout the course of the reaction wherein the external heat was applied for the purpose of dehydrating the gypsum and the water driven off from the gypsum acted to hydrate the lime.

I have discovered that when burnt lime is mixed with raw gypsum, an exothermic reaction may be initiated, the heat of which without application of heat in addition to that of the reaction causes dehydration of the gypsum, the liberated water being absorbed by the lime to form lime hydrate $Ca(OH)_2$. Furthermore, this reaction when initiated by a starter applied locally in a mass consisting of a mixture of gypsum and burnt lime is self-propagating through this mass. Initiation of the exothermic reaction in the mass is accomplished by the addition of free water in quantities sufficient to start such exothermic reaction. Gypsum ($CaSO_4.2H_2O$) begins to lose its water of crystallization between 55° C. and 60° C. and, accordingly, if a correctly proportioned mixture of burnt lime and raw gypsum is heated to 80° C., sufficient water is liberated from the gypsum and absorbed by the lime to start an exothermic reaction which will provide and maintain a temperature sufficiently high to calcine the gypsum either to plaster of Paris, or to soluble anhydrite depending upon the proportions of lime and gypsum used. The heating of the mass may be accomplished by adding sufficient water to a mixture of quick lime and gypsum to activate a sufficient portion of the lime to generate the desired temperature. By the generation of the temperature, I do not mean necessarily a general temperature throughout the mass, since this temperature need only be generated locally and through propagation will finally become general in the mass.

Water, as a means for initiating the reaction, may be added either by mixing the gypsum, or a portion thereof, with moisture before mixing it with lime, or by adding water in any form to the mixture of lime and the gypsum. The amount of water added for this purpose need only be sufficient to hydrate a portion of the lime so as to generate enough heat to start reaction between the solid ingredients. In gypsum-lime mixtures a minimum of two to three percent of water by weight of the gypsum is generally necessary to supply the initial heat. This water may be added either to a portion of the mass or to the entire mass. This water may also be added through the medium of materials which will hold uncombined water; for example, diatomaceous earth, bentonite, clay, fibrous materials, and the like. Some of these materials will improve the properties of the plasters and will assist in limiting the maximum temperature.

Besides its use in initiating reaction, water may be likewise employed to regulate the temperature of the reaction and limit the same to a desired maximum. This latter function is particularly valuable since in hydrating lime it is always desirable to give the lime an atmosphere of steam through an ample period at a sufficiently high temperature to assure a sound, completely hydrated product. On the other hand, a combination of time and high temperature is deleterious to the gypsum hemi-hydrate, tending to produce soluble anhydrite. This additional water, through the absorption of heat by its evaporation limits the maximum temperature which the reaction may develop. The excess water over that which the lime can absorb, increases the vapor tension of the atmosphere surrounding the particles which is helpful in making the hydrate of lime sound and in preventing the hemihydrate ($CaSO_4 \cdot \frac{1}{2}H_2O$) from being converted to soluble anhydrite ($CaSO_4$). The excess water thus introduced should not exceed fifteen percent by weight of the gypsum.

Another method of reducing the temperature of the reaction is to employ a preponderance of gypsum. When this method is resorted to the excess water liberated from the excess gypsum of the mix acts in the same way as added water to limit the temperature of reaction.

In practicing my invention I do not wish to limit myself to any stated proportion of lime and gypsum. The proportions may be changed in order to produce plasters suitable for different purposes. If the plaster is to be used for a base or rough coat on walls, I prefer to use a preponderance of gypsum. If it is for a smooth or finishing coat, I prefer to use a preponderance of lime.

As specific examples of the lime-gypsum plasters of various types, the following are given. Employing a mix containing a preponderance of gypsum and in which the proportions are 440 parts of high calcium lime to 1,000 parts of gypsum, the maximum temperature resulting from the reaction is approximately 176° C., and the pulverized product shows excellent plastering characteristics and a setting time of fourteen minutes.

Another mix in which the ingredients are in their molecular ratio, that is to say, the percentage of lime contained is sufficient to withdraw the maximum permissible amount of water from the gypsum without forming the anhydrite, (550 parts of high calcium lime to 1,000 parts of gypsum), the maximum temperature of the reaction is approximately 192° C., and the pulverized product has excellent plastering characteristics and a setting time of sixteen minutes.

When employing my process with dolomitic lime-gypsum mix in which there is a preponderance of lime (CaO) as compared with the gypsum, the following proportions may be employed:

| | Parts |
|---|---|
| Dolomitic lime | 1,333 |
| Gypsum | 1,000 |
| Water | 122 | these ingredients are mixed rapidly together, the free water in the mix combining with a portion of the lime so that the reaction begins immediately. With a mixture of this character a temperature of approximately 163° C., results and the pulverized product has excellent plastering characteristics and a setting time of seven minutes.

While I have above given specific temperatures as resulting from the reaction of given proportions of the material, it will be understood that these temperatures will vary considerably with varying conditions of handling and with variations in the quality and age of the materials employed.

After the production of the reacted product further treatment is in accord with the customary practices of the plaster trade, consisting in refinishing, when necessary, mixing with retarder, fibre and other ingredients as or if required for various uses.

It will be evident from the foregoing that there are several methods of applying the process and that various modifications may be resorted to without in any manner departing from the spirit of my invention.

I claim:

1. The process of producing plasters consisting in providing a mass of intermingled burnt lime and raw gypsum, adding moisture to the mass to initiate reaction therein and permitting the reaction to propagate through the mass until the heat of reaction has calcined the gypsum and the water expelled from the gypsum in calcination thereof has hydrated the lime.

2. The process of producing plasters consisting of providing a mass of intermingled burnt lime and raw gypsum, adding moisture to initiate reaction in a limited portion of the mass and permitting the reaction to propagate through the mass until the heat of reaction has calcined the gypsum and the water expelled from the gypsum in calcination thereof has hydrated the lime.

3. The process of claim 1 in which the added moisture is disseminated through the mass.

4. The process of producing plasters comprising intermingling burnt lime, raw gypsum and moistened diatomaceous earth whereby the free moisture of the diatomaceous earth combines with the lime to hydrate the same and the heat generated by the lime in hydration calcines adjacent portions of gypsum thereby providing further moisture for the hydration of adjacent lime particles whereupon the reaction thus instituted propagates throughout the mass.

5. The process of producing plasters comprising intermingling burnt lime, raw gypsum and moistened fibrous material whereby the free moisture of the fibrous material combines with the lime to hydrate the same and the heat generated by the lime in hydration calcines adjacent portions of gypsum thereby providing further moisture for the hydration of adjacent lime particles whereupon the reaction thus instituted propagates throughout the mass.

6. The process of producing plasters comprising intermingling burnt lime, raw gypsum and moistened clay whereby the free moisture of the clay combines with the lime to hydrate the same and the heat generated by the lime in hydration calcines adjacent portions of gypsum thereby providing further moisture for the hydration of adjacent lime particles whereupon the reaction thus instituted propagates throughout the mass.

7. The process of producing plasters comprising intermingling burnt lime, raw gypsum and a moistened filler whereby the free moisture of the filler combines with the lime to hydrate the same and the heat generated by the lime in hydration calcines adjacent portions of gypsum thereby providing further moisture for the hydration of adjacent lime particles whereupon the reaction thus instituted propagates throughout the mass.

SAMUEL GERARD McANALLY.